(12) United States Patent
Pedroia et al.

(10) Patent No.: US 11,445,731 B2
(45) Date of Patent: Sep. 20, 2022

(54) DEVICE AND METHOD FOR TYING A MASS FILLED INTO A SKIN

(71) Applicant: Inotec Gmbh Maschinenentwicklung Und Vertrieb, Reutlingen (DE)

(72) Inventors: Luigi Pedroia, Quartino (CH); Stefano Pedroia, Quartino (CH)

(73) Assignee: Inotec Gmbh Maschinenentwicklung und Vertrieb, Reutlingen (DE)

( * ) Notice: Subject to any disclaimer, the term of this patent is extended or adjusted under 35 U.S.C. 154(b) by 64 days.

(21) Appl. No.: 17/043,094

(22) PCT Filed: Mar. 27, 2019

(86) PCT No.: PCT/EP2019/057689
§ 371 (c)(1),
(2) Date: Sep. 29, 2020

(87) PCT Pub. No.: WO2019/185693
PCT Pub. Date: Oct. 3, 2019

(65) Prior Publication Data
US 2021/0022354 A1    Jan. 28, 2021

(30) Foreign Application Priority Data
Mar. 29, 2018    (EP) ..................................... 18165177

(51) Int. Cl.
*A22C 11/00*    (2006.01)
*A22C 11/12*    (2006.01)
*B65H 69/04*    (2006.01)

(52) U.S. Cl.
CPC ............ *A22C 11/122* (2013.01); *B65H 69/04* (2013.01)

(58) Field of Classification Search
CPC .............................. A22C 11/122; A22C 11/12
(Continued)

(56) References Cited

U.S. PATENT DOCUMENTS 2,949,630 A * 8/1960 Sachsenroder, Sr. .................... B65B 13/265
452/48
4,401,329 A * 8/1983 Pedroia ................ A22C 11/122
452/48

(Continued)

FOREIGN PATENT DOCUMENTS

DE         1632142 A1   11/1970
DE    102014110153 A1    1/2016
(Continued)

OTHER PUBLICATIONS

International search report for patent application No. PCT/EP2019/057689 dated May 7, 2019.

*Primary Examiner* — Richard T Price, Jr.
(74) *Attorney, Agent, or Firm* — Bachman & LaPointe, P.C.

(57) ABSTRACT

The invention relates to a device for tying multiple portions of a mass filled into a casing (8) at tying points provided for this purpose using a thread (10). The device comprises a rotor (1) and a guide device (20) which is connected to the rotor (1) for guiding the thread (10). The rotor (1) has a receiving section (18) for receiving multiple windings of the thread (10), and the device is designed such that the thread (10) is guided from the receiving section (18) by the guide device (20) and is wound about the tying point during a rotation of the rotor (1). The device additionally has a reservoir for receiving the thread (10), wherein the device additionally has a supply device (9), and the supply device (9) is designed to either supply the thread (10) from the reservoir (12, 15) to the receiving section (18) or to remove the thread from the receiving section (18).

9 Claims, 1 Drawing Sheet

(58) Field of Classification Search
USPC .......................................................... 452/48
See application file for complete search history.

(56) References Cited

U.S. PATENT DOCUMENTS

| | | | |
|---|---|---|---|
| 10,785,987 B2* | 9/2020 | Melchert | A22C 11/127 |
| 2008/0207104 A1* | 8/2008 | Zurwieden | A22C 11/122 |
| | | | 452/47 |

FOREIGN PATENT DOCUMENTS

| | | | |
|---|---|---|---|
| EP | 0499579 A1 | 8/1992 | |
| EP | 0865732 A1 | 9/1998 | |

* cited by examiner

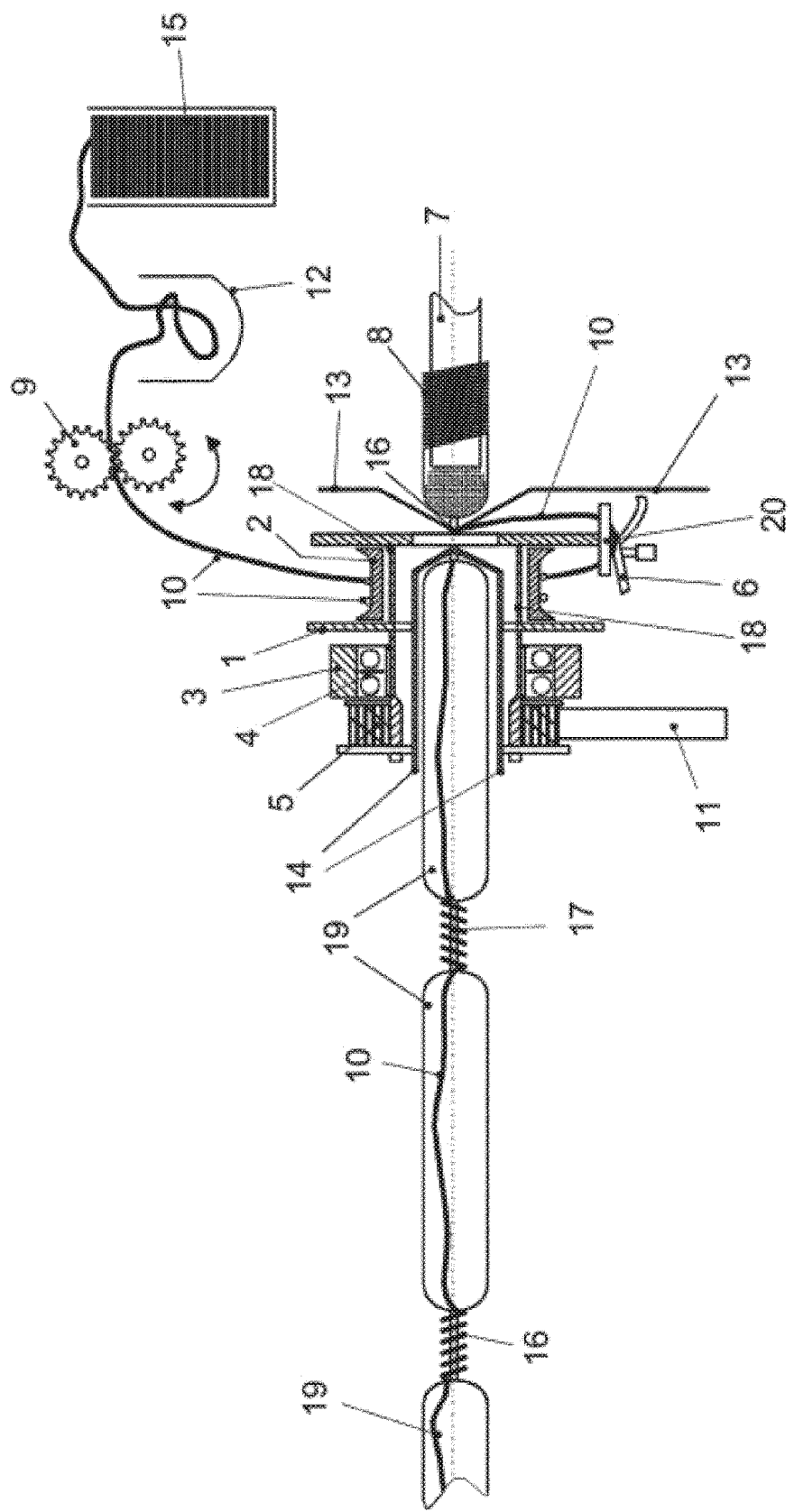

DEVICE AND METHOD FOR TYING A MASS FILLED INTO A SKIN

TECHNICAL FIELD

The present invention relates to a device and a method for tying off a mass filled into a skin.

PRIOR ART

Such devices and methods are already known and used in various forms and designs. The DE 10 2014 110 153 A 1, for example, discloses a device and a method for tying sausages to a sausage strand. For binding the sausages, the device disclosed there, comprises a rotating support ring on which a cage and a counterweight are located. The cage houses a thread roll and thus the thread used for binding. The counterweight serves to avoid imbalance which the cage would cause when the support ring rotates.

The DE 10 2014 110 153 A 1 deals with the problem that the weight of the cage decreases due to the consumption of the thread during operation. If, for example, the counterweight is adjusted to the weight of the cage with an unused or fully filled thread roll in it, an imbalance will steadily increase during operation due to the decreasing weight of the thread roll.

To solve this imbalance problem, which inevitably occurs during thread consumption, the DE 102014 110 153 A1 proposes to adjust the position of the counterweight during operation so that an imbalance caused by the thread consumption is compensated.

This successfully eliminates the imbalance, but the machine still has the following disadvantages:

In order to prevent machine downtime, one of the aims of the machine development is to be able to load the largest possible thread rolls with the longest possible threads into the cage. However, since the cage loaded with a full thread roll, together with the counterweight matched to its weight, exerts a significant influence on the torque required to rotate the support ring, the maximum length of the thread is clearly limited. Finally, the torque provided by the drive cannot be increased arbitrarily.

The weight of a roll of string which is used in a device according to the DE 10 2014 110 153 A1, is about 150 grams, for example. With a usual weight of about 0.5 grams per meter of thread, there are about 270 meters of thread on such a roll. Such binding machines usually run at very high throughputs, often up to 300 sausages are bound per minute. The thread roll must therefore be changed relatively often.

Of course, it is possible to optimize the device with known constructive measures in such a way that thread rolls with a higher weight and thus longer thread can be used, for example by using more stable—and thus usually more expensive—individual parts and materials. Nevertheless, the limitation by the torque, which the drive can provide to a maximum, remains.

It is also true that the imbalance problems with heavier thread rolls can have serious consequences. If an imbalance problem occurs on a machine according to the the DE 102014 110 153 A 1, which is loaded with a very heavy thread roll, because, for example, the position-variable counterweight works incorrectly, the damages to the machine can be very serious. Due to the increasing weight of the thread roll and the increasing risk of damage, no attempt is made to optimize the device exclusively with regard to the heaviest possible thread rolls.

Furthermore, it is of course always an objective of the machine development to keep the maximum torque to be applied by the drive as low as possible in order to keep any possible loads, wear, the necessary stability of the installed parts and energy consumption as low as possible. It goes without saying that the two aforementioned goals are in contrary to each other and that the achievement of one of the two goals excludes the achievement of the other goal.

From the EP 0 865 732 A 1 another machine for tying sausages is known. There it is suggested to use a bobbin concentric to the chain of sausages to be bound on the rotor or support ring, on which the thread or cord is wound. Since the imbalance problems are avoided due to the concentric design, it is possible to increase the cord or thread length by 10 times compared to the previously used cord lengths.

Thus, according to the EP 0 865 732 A1, a thread roll with a weight of up to 1500 grams can be used. However, it has been shown that the machine described in the EP 0 865 732 A1 causes numerous problems in practice. For example, it was not possible to adjust the friction between the cord bobbin and the bobbin holder or the rotor in such a way that at the beginning of the rotational movement the cord bobbin is set in rotation as desired on the one hand and on the other hand comes to an immediate stop when the rotational movement is finished. The Inertia and the friction coefficients could not be optimized to a satisfactory degree. Of course, it is also important to note that during operation or during unwinding and consumption of the thread, no imbalance problems occur, but the weight of the thread on the bobbin does decrease. Accordingly, the torque required during operation also decreases continuously. This also influences the inertia and friction behaviour, so that the bobbin partially rotated with the rotor, depending on how much thread was used. This unpredictable delayed start of the bobbin rotation when the rotor is turning, and the equally unpredictable continued rotation of the bobbin when the rotor is at a standstill, can lead to undesired unwinding of the thread with tangles as well as to undesired tension on the thread with corresponding load or even risk of tearing.

Since the bobbin partially rotated with the rotor, it was impossible to adjust the torque and the rotation speed to ensure reliable operation both immediately after loading the device with a new thread roll and when the thread roll was almost completely used up. Due to the inertia of the bobbin, which was constantly changing due to consumption of the thread during operation, reliable starting and stopping of the rotational movement could not be controlled.

It was also considered to design the machine in such a way that the cord bobbin rotates with the bobbin holder only to a very small extent. In this respect, too, attempts to optimize the friction coefficient and inertia of the very heavy bobbin failed. Although it was not desired, it was not possible to prevent the bobbin from rotating.

Object of the Invention

The object of the present invention is to overcome the disadvantages of the prior art.

Solution

The features disclosed herein lead to the solution of the object.

Advantageous embodiments are also described herein and in the dependent claims.

A device for tying several portions of a mass filled into a skin at designated tying points with a thread according to a first embodiment of the present invention comprises a rotor. The skin can be intestine, artificial gut or the like. The mass is especially food, for example meat, meat substitute, sausage meat or similar. The device is therefore preferably used to tie individual portions or sausages after the corresponding mass has been filled into the skin. The device is particularly preferred for filling and binding the portions or sausages, i.e. portioning.

The rotor is sometimes also called a support ring.

The aforementioned machine also includes a guide means connected to the rotor for guiding the thread. The guide means may, for example, be one or more passage or guide openings as described in EP 0 865 732 A1. These can be part of an optional brake described in more detail below. Preferably, the guide means is mounted on the outside of the rotor.

The rotor includes a receiving section for receiving several windings of the thread. The receiving section can be a part of a lateral surface of the mostly essentially cylindrical rotor or a cylindrical section of the rotor.

The device is set up in such a way that the thread is led from the receiving section through the guiding device and wound around the tying point during one rotation of the rotor.

The device also has a reservoir to receive the thread. This reservoir is designed separately from the rotor and, in particular, is not torque-proof connected to the rotor.

The reservoir can be of various designs and include one or more facilities. In the simplest case, the reservoir is a thread roll or bobbin, which can be rotatably mounted and stores a supply of thread. This bobbin can be rotated passively, for example, when the feeding means feeds the required thread to the receiving section. The thread roll or bobbin can also be static, so that it does not rotate during operation, whereby the thread is pulled off the stationary thread roll during operation. Preferably, in addition to the thread roll, the reservoir includes a compensator that serves to receive the thread that the feeding means removes from the receiving section. The compensator can be a simple compensating reservoir. A bobbin can also be used as a compensating reservoir. For example, a bobbin can be used which is rotated by a drive and winds up the thread that is removed from the receiving section by the feeding means to prevent unwanted entanglement or tangling of the thread in the compensator. Alternatively or complementarily, the bobbin, which stores the thread supply, can also be actively rotated, i.e. equipped with a drive.

The device also has a feeding means, which is set up to either feed thread from the reservoir to the receiving section or remove it from the receiving section.

The feeding means can be any means suitable for feeding a thread. For example, a pair of rolls, a pair of gears, a bobbin or the like may be considered.

For the guide means and also for all other means and components attached to the rotor, a counterweight should be assigned to each of them, if possible, in order to avoid imbalance problems.

The thread is preferably removed by running the feeding means in reverse.

It may be considered that the receiving section itself is capable of receiving several windings of the thread, e.g. a lateral surface of a cylindrical part of the rotor can act as a receiving section. Alternatively, the receiving section may be designed to receive a bobbin or a ring or the like, which in turn may receive several windings of the thread.

The device may include a brake associated with the rotor. Such a brake is preferably located outside the rotor. The brake may include the guide means or be separate from it. To avoid the occurrence of imbalance problems, a counterweight can be mounted on the rotor opposite the brake. In this case, it may also be considered to provide a second brake instead of a counterweight in order to prevent imbalance problems. As described in the EP 0 865 732 A1, such a second brake can, for example, be set to an alternative thread type or have an alternative braking force. Thus, such a second brake provides the necessary weight compensation on the one hand and reduces the effort for adjustments of the braking force or other parts of the brake in relation to the thread to be used on the other hand. After a thread change, the second brake can simply be used.

Further details and, in particular, functions of the aforementioned embodiments of the device are explained with reference to the following embodiment examples of the method according to the invention.

A method for setting several portions of a mass filled into a skin at tying points provided for this purpose according to an embodiment of the present invention is occurred with a device described above.

The subsequent filling of the mass into the skin as well as the displacement of the mass at the desired tying points can preferably also be effected by the device described above and preferably also be corresponding to the procedure described below. For this purpose, the device according to the invention can be equipped with a filling device, for example.

The method includes the following steps:
positioning of a first tying point
rotation of the rotor in a first direction of rotation and simultaneous advancement of the thread through the feeding means, wherein the feeding means guides thread from the reservoir onto the receiving section and wherein the rotation of the rotor guides the thread from the receiving section through the guiding means to the tying point and winds around the tying point during the rotation of the rotor
positioning of a second tying point and simultaneous advancement of the thread through the feeding means to bridge the distance between the first and the second tying point
rotating of the rotor in a second direction of rotation counter to the first direction of rotation and simultaneous pushing back of the thread by the feeding means wherein the feeding means removes the thread from the receiving section and wherein, by the rotation of the rotor the thread is guided from the receiving section through the guide means to the tying point and is wound around this during the rotation of the rotor.

Positioning the tying point means, for example, that the skin is moved, for example in the manner explained in more detail below, in such a way that the intended or desired tying point lies in such a way that the tying can be occurred with the aid of the device or by the method according to the invention.

For example, the skin or the sausage chain is aligned during positioning in such a way that a thread emerging from the guide means winds around the tying point when the rotor rotates.

Before or during positioning, the tying point must be created. Typically, an axial movement of, for example, a developing sausage chain within the device takes place by filling the mass into the skin. The skin is available in nested form or as an intestinal crawler, which is known from the prior art. The tying point is preferably created during the filling process. This is done, for example, by guiding suitable displacement pairs radially towards the skin at the intended tying point, and at least one of the displacement pairs, which is accordingly called a dynamic displacement pair, then moves axially to create the tying point. Such a displacement process is described, for example, in the aforementioned prior art documents. For example, the levers or clamping tongs of EP 0 865732 A1 serve to displace the mass.

Preferably, the positioning of the tying point results by itself by weight-controlled or weight-accurate portioning of the individual sausages or the like. For example, a target weight of a sausage is set in advance. The desired portion of the mass is filled into the skin via a filling device, especially via a filler tube, until this portion has reached the target weight. Here the skin moves preferably only by mass, which enters it. The skin may be in the form of a shirred intestine or the like and is preferably put over the filler tube. After the desired portion has been filled into the skin with the target weight, the skin is set.

The weight-controlled portioning is well known. Here, any means can be used to determine when a quantity of the mass corresponding to the target weight was filled in.

The rotation of the rotor in the first direction of rotation is preferably not a single full revolution, but several revolutions. For example, 1 to 20 revolutions may be considered. In this case, it is to be noted that for each full revolution of the rotor, one winding of the thread is looped around the tying point in every case. At the same time, for each full revolution of the rotor, one winding of the thread is wound onto or unwound from the receiving section, depending on the direction in which the rotor rotates and on whether there are already windings of the thread on the receiving section.

The advantages of the method according to the invention are fully exploited in particular when the same number of rotations is executed in the first and second direction of rotation. This ensures that all thread windings which are wound onto the receiving section are unwound again when the rotor rotates in the opposite direction. Thus, the maximum weight that can be absorbed is the weight of the thread section that results from the revolutions in one direction of rotation.

The first direction of rotation can be a right-hand rotation while the second direction corresponds to a left-hand rotation.

The bridging of the distance between the tying points during the filling process of the sausage chain or similar is done in such a way that, for example, between the tying points of two successively bound sausages, a piece of thread is dragged along as a connecting piece. Sausages and the like are usually bound in such a way that the thread is wound tightly around the tying points and is carried along slackly between the tying points along the sausages. This dragging of the thread or cord is described in EP 0 865 732 A1.

Preferably, the method or device according to the invention comprises the aforementioned filling device, which is structurally and functionally described in EP 0 865 732 A 1, in particular with reference to FIG. 10.

It is preferable to remember that after the rotor has rotated in the second direction of rotation, a plurality of further tying points are positioned and tied, whereby a third and all further odd-numbered tying points are handled identically to the first tying point and wherein a fourth and all further even-numbered tying points are handled identically to the second tying point. Between the tying points, the thread is preferably dragged along as described above.

It may be remembered that the tying points are created before or during positioning by displacing mass within the skin from the desired tying point. Suitable devices for displacing the mass are known and can be taken from EP 0 865 732 A1, for example, in the form of displacement pairs or levers or clamping tongs.

A brake mentioned above can be applied during the winding of the tying point to tighten the thread and released during positioning—and thus during the dragging of the thread—to release the thread slackly and bridge the distance between successive tying points.

It may be remembered that the feeding means, complementary or alternative to the brake described above, tightens the thread during the winding of the tying point. The feeding means alone can therefore tighten the thread in the time intervals in which such tightening is desired. It can replace the brake.

An essential advantage of the device according to the invention as well as of the method according to the invention is to be seen in the fact that the weight of the thread located on the receiving section, which co-determines a torque required for driving the rotor, is significantly reduced compared to the prior art. While, according to the prior art, the entire supply of thread was always stored on the rotor or support ring, according to the present invention the thread supply is stored in the reservoir. Only as much thread is wound onto the receiving section as the number of revolutions compulsorily performed by the rotor to tie a single tying point.

As described at the beginning, the weight of the thread mounted on the rotor was previously between 150 and 1500 grams. Although the weight of the thread has been reduced by the consumption of the thread during operation with known devices, the known devices must of course be designed for the maximum weight of the roll, i.e. for 150 to 1500 grams.

If the receiving section of the present invention has a diameter of 110 millimetres and thus a circumference of approximately 346 millimetres and if 10 windings are wound around each tying point, the 10 revolutions of the rotor wind 3460 millimetres of thread onto the rotor or onto the receiving section, which corresponds to the maximum weight of the thread to be carried by the rotor At a weight of 0.5 grams per meter of thread, less than 2 grams of thread are wound onto the rotor The maximum weight of the thread to be carried by the rotor would be reduced by about 75 times and 750 times in the typical example described above.

This allows the device to work much faster or the method to be performed much faster. Furthermore, the stability requirements for the design of the rotor or the entire device are reduced, which makes production more economical. Since the maximum rotation speed of the design of the device and the method is also limited by the torque to be applied, the device according to the invention can be operated at a higher rotation speed, which in turn increases the efficiency or throughput. Increases of up to 30% are possible.

The efficiency of the process is not only increased by higher rotation speeds compared to known devices and methods, but also by the fact that the frequency with which the thread or bobbin has to be replaced due to consumption can be significantly reduced. This in turn avoids downtimes and increases efficiency. The reason for this is that in the reservoir described above, considerably larger bobbins weighing several kilograms can be stored. Compared to the known thread quantities, which were in the range of 150 to 1500 grams, this represents an enormous increase.

The weight saving is further enhanced by the fact that, according to the present invention, a bobbin or thread roll to be attached to the rotor can be completely renounced. With known devices, where the entire thread supply is located on the rotor in one form or another, it would be uneconomical, for example, to wind the thread laboriously on the rotor in order to save the weight of the bobbin carrying the thread. In the present invention, however, the rotor or its receiving section typically only has to carry a few windings of the thread, which are also alternately wound and unwound during operation. The bobbin can therefore be renounced without any problems and its weight can be saved accordingly without any problems, since no laborious winding of the thread onto the rotor is necessary.

Furthermore, in the present invention, the monitoring of a quantity of thread still available is considerably simplified. If the thread rotates in a cage or wound on the rotor at high speed, as is usual for machines according to the prior art, monitoring the thread or the remaining thread supply is more difficult. For safety reasons, the machine should be stopped and the thread or the bobbin replaced well before the thread is used up. In contrast, according to the present invention, the bobbin located in the reservoir, which houses the thread supply, can be monitored very easily and without technical aids, since the bobbin located in the reservoir moves only at very low speed. Furthermore, this bobbin rotates only when the rotor rotates in one of the two possible directions of rotation, whereas it stands still when rotating in the other direction. This makes it much easier to monitor the remaining thread quantity.

BRIEF DESCRIPTION OF THE DRAWINGS

Further advantages, features and details of the invention result from the following description of preferred embodiment and from the drawing.

DETAILED DESCRIPTION

The FIGURE shows a device for tying according to an embodiment of the present invention.

The device comprises a rotor 1 with a receiving section 18. A ring or a bobbin 2 on which several windings of thread 10 are wound is pushed onto the receiving section 18. Furthermore, a housing 3 and a roller bearing 4 are visible. A belt pulley 5 and a toothed belt 11 are also visible. Furthermore, displacement pairs 13, 14 are shown. A brake 6 is attached to the rotor 1.

Furthermore, on the right side of the FIGURE, a filler tube 7 of a filling device not shown can be seen, which protrudes into the skin 8. On the left side of the FIGURE sausages 19 are visible. Between the sausages 19 there are left-turned tying point 17 and a right-turned tying point 16.

At the top of the FIGURE, a feeding means 9 in the form of a gear pair, a reservoir 12 and a thread roll 15 can be seen.

With reference to the FIGURE, the functionality of the device according to the invention is explained as follows:

The toothed belt 11 is set in motion via a drive not shown, which in turn causes the rotation of the rotor 1. This arrangement is known and its function can be seen, for example, in EP 0 865 732 A 1.

To produce a sausage chain as shown on the left in the FIGURE, the mass is filled into the skin 8 through the filler tube 7. The displacement pairs or clamping tongs 13, 14 displace the mass within the skin 8 in such a way that there is an unfilled section of skin 8 at the desired tying point 16 (right of the FIGURE). The function of the displacement pairs or clamping tongs 13, 14 is described in EP 0 865 732 A1. By turning the rotor 1, the tying point 16 is bound off with thread 10; this is also described in EP 0 865 732 A1.

After the sausage chain is bound, it is moved on, which in the FIGURE corresponds to a movement to the left. This further movement is preferably done by filling the mass into the sausage chain to portion the next sausage to be bound. Afterwards, the steps described above are repeated.

While the aforementioned steps are mainly known from EP 0 865 732 A 1, the core of the invention lies in an improved tying process, which is described below.

Just like the device from EP 0 865 732 A 1, the device according to the execution example of the present invention is equipped with a forced guidance of the thread 10 as soon as the rotor 1 rotates. The reason for this is that the guide means 20, which is shown in the embodiment, is designed in one piece with the brake 6 and essentially consists of two through openings, on the one hand loops a section of the thread 10 around the tying point 16 and on the other hand loops another section of the thread 10 around the receiving section 18 with each revolution of the rotor 1.

However, in contrast to the device according to EP 0 865 732 A 1, not the entire bobbin or the entire thread supply is located on the rotor 1. The difference between the device and method according to the invention and the EP 0 865 732 A 1 and other known devices and methods becomes clearly apparent when looking at the tying of two consecutive tying points. It is assumed that there is no thread winding on ring 2 yet. The thread 10 is guided from the thread roll 15 via the feeding means 9 along the thread roll or ring 2 to the brake 6 or through the guide means 20 to the tying point.

For the steps described below, it is assumed that the tying points each have a diameter of about 4 millimetres and that the ring 2 has a diameter of about 110 millimetres.

After the tying point 16, which hast to be bound, has been positioned as shown in the FIGURE, the mass is displaced by the displacement pairs 13, 14 in the area of the desired tying point 16. The rotor 1 preferably starts to rotate during an axial movement of the dynamic displacement pair 14. For example, it performs ten right-hand rotations. The thread 10, for example, is guided ten times around the tying point 16. For each full revolution, an approximately 13 mm long thread section is wound around the tying point 16. At the same time, for each full revolution, a thread section about 346 millimetres long is wound around the ring 2. The feeding means 9 must therefore provide about 359 millimetres of thread 10 for each full revolution of the rotor 1, i.e. 3590 millimetres of thread 10 for ten revolutions of the rotor 1.

It is to be noted that during the rotation of the rotor 1, the thread 10 is positively guided by the thread 10 in the guide means 20. This means that 3590 millimetres of thread 10 are always required per revolution of the rotor 1. This requirement is initially independent of how the ring 2 moves relative to the receiving section 18 and also independent of how the thread windings that are looped around the ring 2 move relative to the ring 2 or move with it instead. Numerous configurations are conceivable here. In this way the ring 2 can follow the rotation of the rotor 1, which can make it easier to take up one winding of the thread 10 on the ring 2 per rotation of the rotor 1. At the same time, the thread 10 can always move a little faster relative to the ring 2, since an additional 13 mm of the thread 10 is wound around the tying point 16 for each full revolution of the rotor 1. However, it is also conceivable that there is no relative movement between the thread 10 and the ring 2, but that the ring 2 rotates in the same direction as the rotor 1, but somewhat faster than the rotor 1, in order to pick up the 346 mm thread 10 per revolution as well as to deliver the 13 mm thread 10 to the tying point 16. In this case, there would be no relative movement between the ring 2 and the thread 10 wound around it; both would rotate at the same speed.

Preferably, the ring 2 has a certain play in relation to the rotor 1, so that the ring 2 rotates with the rotor 1 during one revolution of the rotor 1. However, especially when the rotor 1 is at a standstill, it overcomes a static friction prevailing between it and the rotor 1 and can rotate relative to the rotor 1.

Preferably, the brake 6 ensures that the thread section between the tying point 16 and the brake 6 is tautly tensioned, which causes a tight winding of the thread 10 around the tying point 16 and prevents tangling or the like. Therefore, the brake 6 is preferably applied during the rotation of the rotor 1. The same applies to the thread section between the feeding means 9 and the ring 2, whereby the feeding means 9 ensures a taut winding of the thread 10.

At the end of the right-hand rotation of the rotor 1 described above, there are 10 windings of thread 10 on the ring 2 and the tying point 16 was bound with 10 windings of thread 10.

After the tying point 16 has been bound, the sausage chain continues to move in axial direction, i.e. to the left in the FIGURE, by adding or removing further mass as described above, until the next desired tying point (not shown in the FIGURE) is positioned so that it can be bound. As shown in the FIGURE on the left, the thread 10 is guided along the sausages 19, i.e. from the tying point 16 (far left in the FIGURE) via the tying point 17 (in the middle of the FIGURE) to the tying point 16 (on the right in the FIGURE, in the process of tying). This applies, of course, to the entire sausage chain to be produced. During the axial movement to the left, the brake 6 is therefore released when the rotor 1 is preferably at standstill. The feeding means 9 feeds a thread section to the ring 2, the length of which corresponds at least to a distance between two adjacent tying points. Preferably, a thread section is fed, the length of which is greater than the distance between two adjacent tying points, e.g. by up to 10% or 20% greater. The reason for this is that the sausages 19 should not be bent by the thread 10, which connects the tying points. Therefore this thread section must be as slack as possible.

After the next tying point (not shown in the FIGURE) has been positioned and the displacement pairs 13, 14 have created the tying point as already described, the tying is carried out as described above, with the difference that the rotor 1 now rotates in the opposite direction, i.e. left-hand in this example. For each full revolution of the rotor 1 in left direction, an approximately 346 millimetre long section of the thread 10 is unwound from the ring 2. At the same time, about 13 millimetres of the thread 10 is wound around the tying point. The difference, i.e. about 333 millimetres of the thread 10, which was previously looped around the ring 2, is pushed back or removed from the ring 2 with the help of the feeding means 9 and transported into the reservoir 12. For this purpose, the feeding means 9 rotates backwards. Preferably, of course, the same number of revolutions is carried out when tying by turning to the left as when tying the previous tying point 16 revolutions to the right. In this way, it is ensured that at the end of the last left turn, there is no thread winding left on the ring 2.

After the tying point has been bound by turning to the left, the sausage chain is moved axially as described above and the following tying point can be bound by turning the rotor 1 to the right. This process sequence is repeated accordingly, i.e. the tying takes place by alternating left and right rotation of the rotor 1.

During the next tying with a right-hand turn, which follows the left-hand turn described above, the thread 10 temporarily stored in the reservoir 12 is of course used up first.

It is to be noted that the FIGURE shows a snapshot during a right-hand turn, as the thread 10 is recognizably wound several times around the ring 2.

Although only a preferred embodiment of the invention was described and presented, it is obvious that the skilled person can add numerous modifications without leaving the essence and scope of the invention. Some of these modifications are described below.

The thread roll 15, the feeding means 9 and the reservoir 12 can be designed as desired. They can be separate components, but they can also be firmly connected to the device. It is only important that the above mentioned components are preferably not attached to the rotor 1, thus keeping its weight as low as possible. Preferably, the feeding means 9 ensures a constant pretension of the thread 10 between the ring 2 or the receiving section 18 and the feeding means 9.

It goes without saying that the number of windings or revolutions of the rotor 1, which are required for tying a single tying point, can be set individually. Usually, depending on the type of sausage, about 1 to 20 windings are needed. The numerical values for the revolutions and the thread consumption described above are therefore only an explanatory and not restrictive example. The same applies to the size specifications.

Of course, the ring 2 and also the receiving section 18 can have a different circumference than 110 millimetres, for example. It should also be mentioned that full revolutions do not necessarily have to be carried out for setting. It could also be done with, for example, 12.5 revolutions per tying point. However, the special advantages of the present invention, namely the low maximum weight of the thread 10 on the rotor 1, arise in all embodiments especially when the number of consecutive left- and right-hand turns is identical. Only then is a thread section wound onto the ring 2 or the receiving section 18 during the right-hand turns, which is then removed again during the left-hand turns.

Naturally, the direction of rotation, i.e. left or right rotation in the above example, was chosen arbitrarily to explain the principle of the present invention. The procedure can also be designed in such a way that the thread 10 is wound onto the ring 2 or the receiving section 18 during the left-hand rotation and unwound again during the right-hand rotation.

Components of the device according to the invention, which are identically present in the device according to EP 0 865 732 A 1, preferably correspond in their function to the components shown there. The same applies to the method steps performed by these components. Just as an example, the drive of the rotor 1, for example a servo motor, the filler tube 7, the displacement pairs 13, 14, which are designed as clamps or levers, the roller bearing 4 and the brake 6. These components can be found in the EP 0 865 732 A 1, for example with reference to FIGS. 1 and 10 shown there.

Additional process steps and/or device features may be considered:

The receiving section 18 or the rotor 1 can have controllable grippers, bolts, brakes or the like, which hold the ring 2 rotationally fixed during a rotation of the rotor 1 and allow a rotation of the ring 2 relative to the rotor 1 during a standstill of the rotor 1. Furthermore, a bearing provided on the receiving section 18 or elsewhere on the rotor 1 may also be considered to allow a rotation of the ring 2 relative to the rotor 1 with as little friction as possible when the rotor 1 is at a standstill.

Numerous variations are conceivable with regard to the tying. For example, it may be considered to tie a tying point twice between two sausages, whereby both tying points are located close to one of the two sausage ends. For this purpose, for example, ten windings are performed twice at each tying point. This can ensure that the sausages 19 can be cut through later on without the meat mass or emulsion escaping. For this purpose, the tying point would first be positioned in such a way that the tying is done near a sausage 19 in the FIGURE on the left. Then the tying point would be positioned in such a way that the sausage is bound close to a sausage 19 in the FIGURE on the right. Only then, the sausage chain would be moved further to the left by the pressure of the mass entering through the filler tube 7 so that the following tying point can be created by the displacement pairs 13, 14.

It may also be remembered to move the tying point slowly to the left during the tying in the FIGURE in order to wind the thread 10 around the entire tying point.

Before tying the very first tying point of a sausage chain, the thread 10 can be threaded or, for example, aligned manually so that the device can automatically perform the steps described above.

Several of the components and process steps mentioned are optional:

The ring 2 can also be omitted. The thread 10 would then be wound around the receiving section 18. Preferably, its surface quality, especially with regard to its frictional properties, is then selected in such a way that the thread 10 can move relative to the receiving section 18, since, for example, with each right-hand turn, the thread 10 moves in the same direction as the rotor 1 but somewhat faster than the latter, as described above. For this purpose, the thread 10 must be able to move relative to the receiving section 18.

The brake 6 can also be omitted. Instead, the feeding means 9 can be used to tighten the thread 10. This is especially true since the thread 10 is typically wound only about ten times around the rotor 1 or its receiving section 18 or the ring 2 located there and is therefore not necessarily held by the friction acting between the windings and the receiving section 18 or the ring 2 alone. A tightening of the thread 10 caused by the feeding means 9 therefore also affects the thread section that is looped around the tying point.

The guide means 20 can be configured as desired. It does not have to be part of the optional brake 6. For example, a simple opening close to the outer circumference of the rotor 1 can take over the function of the guide means 20. The guide means 20 can be any device that acts as a driver for the thread 10 as soon as the rotor 1 starts to rotate.

The core of the present invention lies in the tying method described above and the associated device components. All the process steps and device features not involved in the tying method are therefore to be regarded as preferred, but nevertheless optional. For example, this concerns the filler tube 7 and the drive of the rotor 1.

Reference list

| | |
|---|---|
| 1 | rotor/support ring |
| 2 | ring/bobbin for thread winding |
| 3 | housing |
| 4 | roller bearing |
| 5 | belt pulley |
| 6 | brake |
| 7 | filler tube |
| 8 | skin |
| 9 | feeding means |
| 10 | thread |
| 11 | toothed belt |
| 12 | reservoir |
| 13 | static displacement pair (clamping tongs) |
| 14 | dynamic displacement pair (clamping tongs) |
| 15 | big spool/thread role |
| 16 | right-turned tying point |
| 17 | left-turned tying point |
| 18 | receiving section |
| 19 | sausages |
| 20 | guide means |

The invention claimed is:

1. Device for tying several portions of a mass filled into a skin (8) at tying points provided therefor with a thread (10), the device comprising a rotor (1) and a guide means (20) associated with the rotor (1) for guiding the thread (10), wherein the rotor (1) has a receiving section (18) for receiving a plurality of windings of the thread (10), the apparatus being arranged such that, on one revolution of the rotor (1), the thread (10) is passed from the receiving section (18) through the guide means (20) and wound around the tying point, wherein the device further comprises a reservoir for receiving the thread (10), the device further comprising a feeding means (9), the feeding means (9) being arranged to either feed thread (10) from the reservoir (12, 15) to the receiving section (18) or to remove thread (10) from the receiving section (18).

2. Device according to claim 1, wherein the receiving section (18) is suitable for receiving several windings of the thread (10).

3. Device according to claim 1, wherein the receiving section (18) is adapted to receive a ring (2) which in turn can receive several windings of the thread (10).

4. Device according to claim 1, further comprising a brake (6) associated with the rotor (1).

5. Method for tying several portions of a mass filled into a skin (8) at tying points provided for this purpose with a device according to claim 1, the method comprising the following steps:

positioning of a first tying point rotating of the rotor (1) in a first direction of rotation and simultaneous advancement of the thread (10) through the feeding means (9), wherein the feeding means (9) guides thread (10) from the reservoir onto the receiving section (18) and wherein the rotation of the rotor (1) guides thread (10) from the receiving section (18) through the guiding means (20) to the tying point and winds it around the tying point during the rotation of the rotor (1)

positioning of a second tying point and simultaneous advancement of the thread (10) through the feeding means (9) to bridge the distance between the first and the second tying point—rotating of the rotor (1) in a second direction of rotation counter to the first direction of rotation and simultaneous pushing back of the thread (10) by the feeding means (9), wherein the feeding means (9) removes thread (10) from the receiving section (18) and wherein, by the rotation of the rotor (1), thread (10) is guided from the receiving section

(18) through the guide means (20) to the tying point and is wound around this during the rotation of the rotor (1).

6. Method according to claim 4, wherein after the rotation of the rotor (1) in the second direction of rotation a plurality of further tying points are positioned and tied, wherein a third and all further odd-numbered tying points are handled identically as the first tying point and wherein a second and all further even-numbered tying points are handled identically as the second tying point.

7. Method according to claim 4, wherein the tying points are created before or during positioning by displacing mass within the skin (8) from the desired tying point.

8. Method according to claim 4, wherein a brake (6) tightens the thread (10) during the wrapping of the tying point and is released during the positioning of the tying point.

9. Method according to claim 5, wherein the feeding means (9) tightens the thread (10) during the winding of the tying point.

* * * * *